(12) United States Patent
Iwasa et al.

(10) Patent No.: US 8,187,692 B2
(45) Date of Patent: May 29, 2012

(54) IN-MOLD LABEL AND MOLDED ARTICLE USING THE SAME

(75) Inventors: Yasuo Iwasa, Ibaraki (JP); Masaki Shiina, Ibaraki (JP); Takatoshi Nishizawa, Ibaraki (JP); Masahiro Kimura, Chiba (JP); Hajime Mizuno, Chiba (JP)

(73) Assignee: Yupo Corporation, Tokyo (JP)

( * ) Notice: Subject to any disclaimer, the term of this patent is extended or adjusted under 35 U.S.C. 154(b) by 726 days.

(21) Appl. No.: 11/365,677

(22) Filed: Mar. 2, 2006

(65) Prior Publication Data
US 2007/0003777 A1 Jan. 4, 2007

(30) Foreign Application Priority Data

Mar. 3, 2005 (JP) ................. P. 2005-058360

(51) Int. Cl.
*B32B 9/00* (2006.01)
(52) U.S. Cl. ............... 428/141; 428/411; 428/517
(58) Field of Classification Search .............. None
See application file for complete search history.

(56) References Cited

U.S. PATENT DOCUMENTS

| | | | | |
|---|---|---|---|---|
| 3,870,549 A * | 3/1975 | Ruygrok | ............... | 428/142 |
| 4,837,075 A * | 6/1989 | Dudley | ............... | 428/220 |
| 5,346,258 A * | 9/1994 | Behm et al. | ............... | 283/102 |
| 5,733,615 A * | 3/1998 | Rackovan et al. | ............ | 428/35.7 |
| 5,952,104 A * | 9/1999 | Sugiyama et al. | .......... | 428/32.34 |
| 6,165,576 A * | 12/2000 | Freedman et al. | .......... | 428/36.91 |
| 6,376,058 B1 * | 4/2002 | Schut et al. | ............. | 428/220 |
| 6,641,914 B2 * | 11/2003 | Lu | ............. | 428/355 AC |
| 6,726,969 B1 * | 4/2004 | Balaji et al. | ............. | 428/35.7 |
| 6,773,653 B2 * | 8/2004 | Miller et al. | ............. | 264/447 |
| 2002/0050319 A1 * | 5/2002 | Nishizawa et al. | ............. | 156/245 |

FOREIGN PATENT DOCUMENTS

| | | |
|---|---|---|
| JP | 58-69015 | 4/1983 |
| JP | 1-125225 | 5/1989 |
| JP | 2002-240131 | 8/2002 |
| JP | 2002-321274 | 11/2002 |

OTHER PUBLICATIONS

ANTEC 2000 Plastics: The Magical Solution, vol. 1, 2000, Society of Plastics Engineers, vol. 1, 138.*
U.S. Appl. No. 11/516,658, filed Sep. 7, 2006, Iwasa, et al.

\* cited by examiner

*Primary Examiner* — Jennifer McNeil
*Assistant Examiner* — Adam Krupicka
(74) *Attorney, Agent, or Firm* — Oblon, Spivak, McClelland, Maier & Neustadt, L.L.P.

(57) ABSTRACT

The invention provides an in-mold label which enables the degree of scumming to be judged during printing and imparts a good appearance to molded articles produced through in-mold molding, and which comprises a base layer (I), a heat-sealable resin layer (II), and a printable layer (III) and has a haze in whole layer of 80-100% and an internal haze of 0-20%. The invention further provides a molded article obtained using the label.

28 Claims, No Drawings

IN-MOLD LABEL AND MOLDED ARTICLE USING THE SAME

BACKGROUND OF THE INVENTION

1. Field of the Invention

The present invention relates to a label for use in in-mold molding in which the label is set in a mold so that the printed side of the label comes into contact with the mold wall and molding is then conducted by introducing a parison of a molten thermoplastic resin into the mold to conduct blow molding or by injection-molding a molted thermoplastic resin in the mold or by introducing a sheet of a molten thermoplastic resin into the mold to conduct vacuum forming or pressure forming to thereby produce a labeled molded article. The invention further relates to a molded article obtained using the label.

2. Description of the Related Art

In processes heretofore in use for integrally molding a labeled molded resin container, a blank or label is inserted beforehand into a mold and a container is then molded in the mold by injection molding, blow molding, differential pressure molding, foam molding, or the like to decorate or otherwise label the container (see, for example, patent document 1: JP-A-58-069015 and patent document 2: JP-A-01-125225). Proposed as such in-mold labels are, for example, a label obtained by subjecting crystalline polypropylene, polyethylene, etc. to extrusion molding or calendaring to obtain a transparent film for use as a base, applying a solution of a low-melting olefin resin such as an ethylene/vinyl acetate copolymer to the base with a gravure coater or the like, and drying the coating and a label obtained by laminating a low-melting olefin resin film to that base with an adhesive or by directly laminating the film to the base by extrusion laminating.

However, use of the transparent film thus obtained has had the following drawback. In the case where the labels are subjected to sheet-by-sheet offset printing, when a trouble such as the so-called scumming, which is the phenomenon in which ink transfer to non-image areas occurs due to a deficiency of dampening water, arises during the printing, it is difficult to notice the trouble through an inspection in which one sheet being printed is drawn out. The occurrence of scumming is noticed only when the stack of prints amounts to about several thousand sheets, and re-printing is then conducted, resulting in a printing loss. Namely, there has been a problem that it is difficult to regulate ink transfer during continuous printing (see, for example, patent document 3: JP-A-2002-240131 and patent document 4: JP-A-2002-321274).

A method has hence been employed in which several white printing papers are inserted at intervals of several hundreds of sheets and printed to examine the degree of scumming and conduct dampening water regulation based on the examination. After the printing, the white printing papers should be taken out and examined for any printing trouble, before the printed matters obtained from the transparent film are shipped. There has hence been a problem that the printing step takes many days and is costly.

SUMMARY OF THE INVENTION

An object of the invention is to provide an in-mold label which enables the degree of scumming to be judged during printing and imparts a good appearance to molded articles produced through in-mold molding and to provide a molded article obtained using the label.

The present inventors made intensive investigations in order to overcome those problems. As a result, it has been found that a printing trouble in offset printing can be made easily distinguishable during continuous printing by regulating the haze in whole layer and the internal haze to specific values and that such haze values enable molded articles produced through in-mold molding to have a good appearance. The invention has been thus completed.

The invention provides the following in-mold labels and molded articles obtained using the same.

1. An in-mold label which comprises a base layer (I), a heat-sealable resin layer (II), and a printable layer (III) and has a haze in whole layer of 80-100% and an internal haze of 0-20%.
2. The in-mold label as described under 1 above wherein the printable layer (III) has a gloss (JIS-Z-8741; measured at 75 degrees) of 40-90%.
3. The in-mold label as described under 1 or 2 above wherein the printable layer (III) contains a maleic-acid-modified vinyl acetate polymer and has an ink adhesion strength, as measured at 24 hours or more after printing, of 1 kg·cm or higher.
4. The in-mold label as described under any one of 1 to 3 above which, when superposed on the same in-mold label, has a coefficient of machine-direction static friction (JIS-K-7125) between the heat-sealable resin layer (II) and the printable layer (III) of 0.55-1.0 and a coefficient of machine-direction kinetic friction between the layers of 0.3-1.0.
5. The in-mold label as described under any one of 1 to 4 above wherein the heat-sealable resin layer (II) has an arithmetic average roughness (Ra) and a ten-point average roughness (Rz), which indicate the surface roughness (JIS-B-0601) of the layer, of 0.5-10 μm and 10-50 μm, respectively.
6. The in-mold label as described under any one of 1 to 5 above wherein the printable layer (III) has an arithmetic average roughness (Ra) and a ten-point average roughness (Rz), which indicate the surface roughness (JIS-B-0601) of the layer, of 0.15-2.0 μm and 2-20 μm, respectively.
7. The in-mold label as described under any one of 1 to 7 above wherein the base layer (I), heat-sealable resin layer (II), and printable layer (III) comprise an unstretched film.
8. The in-mold label as described under any one of 1 to 7 above wherein the heat-sealable resin layer (II) comprises a polyethylene resin having a melting point of 110° C. or lower.
9. The in-mold label as described under any one of 1 to 8 above wherein at least the heat-sealable resin layer (II) contains an antistatic agent.
10. The in-mold label as described under any one of 1 to 9 above wherein the printable layer (III) is printed by a printing technique selected from letterpress printing, gravure printing, offset printing, flexography, and screen printing.
11. A molded article in which the in-mold label as described under any one of 1 to 10 above is attached.
12. The molded article as described under 11 above which comprises a polyolefin resin.

The in-mold label of the invention is effective in easily eliminating any printing trouble during continuous offset printing and imparts a good appearance to molded articles produced through in-mold molding.

DETAILED DESCRIPTION OF THE INVENTION

The in-mold label of the invention and the molded articles obtained using the same will be explained below in detail.

In this specification, each numerical range shown with "-" means the range which includes the values given before and after the "-" as the lower and upper limits.

In-Mold Label

The in-mold label of the invention comprises a base layer (I), a heat-sealable resin layer (II), and a printable layer (III) and has a haze in whole layer of 80-100%, preferably 82-100%, especially preferably 90-100%, and an internal haze of 0-20%, preferably 0-18%, especially preferably 5-18%. In case where the haze in whole layer thereof is lower than 80%, a scumming trouble during printing is difficult to detect and it is also difficult to conduct ink transfer regulation during continuous printing. In case where the internal haze exceeds 20%, molded articles produced through in-mold molding have a poor appearance. The term internal haze herein means the haze inherent in the label. Specifically, it is a value obtained by subtracting the haze component attributable to the label surface roughness from the haze in whole layer. A measurement is made in the manner as described in the Examples which will be given later.

For making the label glossy, the printable layer (III) has a gloss of 40-90%, preferably 50-80%. In case where the gloss of the layer is lower than 40%, the result is a poor appearance after printing.

The printable layer (III) has an ink adhesion strength, as measured at 24 hours or more after printing, of 1 kg·cm or higher, preferably 1-100 kg·cm, more preferably 1-10 kg·cm, especially preferably 1-5 kg·cm. In case where the ink adhesion strength is lower than 1 kg·cm, the ink is mostly peeled off although the peeling encounters resistance. Such adhesion strengths hence pose a problem concerning practical use.

From the standpoint of stably conducting label insertion in in-mold molding, the label, when superposed on the same label, has a coefficient of machine-direction static friction between the heat-sealable resin layer (II) and the printable layer (III) in the range of 0.55-1.0, preferably 0.7-0.9, and a coefficient of machine-direction kinetic friction between the layers in the range of 0.3-1.0, preferably 0.4-0.9. In case where the coefficient of machine-direction static friction is lower than 0.55, the label is too slippy and arouses a label falling trouble. In case where it is higher than 1.0, label slippage is poor to arouse the trouble of doubled labels. The values of the coefficient of machine-direction static friction and coefficient of machine-direction kinetic friction in the invention are ones obtained through measurements made in accordance with JIS-K-7125.

From the standpoint of inhibiting blistering in in-mold molding, the heat-sealable resin layer (II) has an arithmetic average roughness (Ra), which indicates the surface roughness (JIS-B-0601) of the layer, of 0.5-10 μm, preferably 1.5-5.0 μm, and a ten-point average roughness (Rz), which also indicates the surface roughness, of 5.0-50 μm, preferably 7.0-40 μm. In case where the arithmetic average roughness (Ra) and ten-point average roughness (Rz) of the layer are lower than 0.5 μm and lower that 5.0 μm, respectively, blistering occurs to pose a practical problem. In case where the arithmetic average roughness (Ra) and ten-point average roughness (Rz) of the layer are higher than 10 μm and higher than 50 μm, respectively, the label impairs the appearance of in-mold labeled molded articles.

From the standpoint of improving printability, the printable layer (III) has an arithmetic average roughness (Ra) of 0.15-2.0 μm, preferably 0.2-1.0 μm, and a ten-point average roughness (Rz) of 2-20 μm, preferably 4-10 μm. In case where the arithmetic average roughness (Ra) and ten-point average roughness (Rz) of the layer are lower than 0.15 μm and lower than 2 μm, respectively, ink adhesion becomes poor. In case where the arithmetic average roughness (Ra) and ten-point average roughness (Rz) of the layer are higher than 2.0 μm and lower than 20 μm, respectively, the surface roughness is visually recognized, resulting in a poor appearance.

The thickness of the label of the invention may be in the range of 20-250 μm, preferably 40-200 μm. Thicknesses thereof smaller than 20 μm are apt to pose a problem that label insertion into a mold with a label inserter does not result infixing in a proper position or in label rumpling. Conversely, in case where the thickness thereof exceeds 250 μm, the strength of the part located at the boundary between the molded article produced through in-mold molding and the label becomes low and, hence, the molded article has poor dropping resistance.

Base Layer (I)

The base layer (I) employed in the in-mold label of the invention is a layer comprising a thermoplastic resin. Examples of the thermoplastic resin usable in or as the base layer (I) include films of polyolefin resins such as polypropylene resins, high-density polyethylene, medium-density polyethylene, polymethyl-1-pentene, and ethylene/cycloolefin copolymers, poly(ethylene terephthalate) resins, poly(vinyl chloride) resins, polyamide resins such as nylon-6, nylon-6, 6-nylon-6, 10, and nylon-6, 12, ABS resins, and ionomer resins. Preferred of these resins are thermoplastic resins having a melting point in the range of 130-280° C., such as polypropylene resins, high-density polyethylene, and poly(ethylene terephthalate) resins. These resins may be used as a mixture of two or more thereof.

It is preferred that the thermoplastic resin serving as the main component of the base layer (I) be a resin having a melting point higher by at least 15° C. than the melting point of the polyolefin resin constituting the heat-sealable resin layer (II). Preferred of such resins is a polypropylene resin from the standpoints of chemical resistance, cost, etc. As this polypropylene resin is used a propylene homopolymer having isotactic or syndiotactic stereoregularity or a copolymer of propylene as the main component and one or more of α-olefins such as ethylene, butene-1, hexene-1, hepetene-1, and 4-methylpentene-1. This copolymer may be a bi-, tri-, or quadripolymer, and may be either a random or a block copolymer.

An antioxidant, ultraviolet stabilizer, dispersant, lubricant, compatibilizing agent, flame retardant, coloring pigment, and the like can be added to those resins according to need.

In the case where the label of the invention is used as a durable material, it is preferred to add an antioxidant, ultraviolet stabilizer, etc. When an antioxidant is used, it is added generally in an amount in the range of 0.001-1% by weight. For example, a stabilizer such as a steric-hindrance phenol compound, phosphorus compound, or amine compound can be used. When an ultraviolet stabilizer is used, it is added generally in an amount in the range of 0.001-1% by weight. For example, a light stabilizer such as a steric-hindrance amine, benzotriazole compound, or benzophenone compound can be used. The heat-sealable resin layer (II) and the printable layer (III) are formed on the front side and back side, respectively, of the base layer (I). The label of the invention preferably has a density in the range of 0.84-1.02 $g/cm^3$.

Heat-Sealable Resin Layer (II)

The heat-sealable resin layer (II) employed in the invention is a layer comprising an ethylene-based thermoplastic resin. Preferred polyethylene resins usable for constituting the heat-sealable resin layer are ones having a melting point of 110° C. or lower, such as high-density polyethylene having a density of 0.940-0.970 $g/cm^3$, low- to medium-density high-pressure-process polyethylene having a density of 0.900-0.935 $g/cm^3$, linear polyethylene having a density of 0.857-0.940 $g/cm^3$, ethylene/vinyl acetate copolymers, ethylene/acrylic acid copolymers, ethylene/alkyl acrylate copolymers, ethylene/alkyl methacrylate copolymers (the alkyl group has 1-8 carbon atoms), and metal salts (Zn, Al, Li, K, Na, etc.) of ethylene/methacrylic acid copolymers.

More preferred is high-pressure-process polyethylene having a crystallinity (X-ray method) of 10-60% and a number-average molecular weight of 10,000 or linear polyethylene. In particular, linear polyethylene obtained by copolymerizing 40-98% by weight ethylene and 60-2% by weight α-olefin having 3-30 carbon atoms using a metallocene catalyst, especially a metallocene-aluminoxane catalyst, or using a catalyst comprising a combination of a metallocene compound, such as that disclosed in, e.g., International Publication No. 92/01723, pamphlet, and a compound which reacts with the metallocene compound to form a stable anion is optimal from the standpoint of adhesion to containers. Those polyolefin resins may be used alone or as a mixture of two or more thereof. It is preferred that the content thereof be 60-100% by weight, preferably 70-100% by weight.

Known additives for other resins can be added at will to the heat-sealable resin layer (II) in the invention as long as the addition thereof does not adversely influence the desired heat sealability. Examples of the additives include antistatic agents, dyes, nucleating agents, plasticizers, release agents, antioxidants, flame retardants, and ultraviolet absorbers. The thickness of the heat-sealable resin layer (II) may be in the range of 1-30 μm, preferably 5-20 μm. The thickness of this layer should be 1 μm or larger in order that the heat-sealable resin layer (II) during molding, e.g., blow molding, might be melted by the heat of molten polyethylene or polypropylene in a parison or another form to tenaciously fuse the label to the molded container. On the other hand, thicknesses thereof exceeding 30 μm are undesirable because the label curls and this makes offset printing difficult or makes label fixing to molds difficult.

Printable Layer (III)

Examples of the material of the printable layer (III) include films of polyolefin resins such as polypropylene resins, high-density polyethylene, medium-density polyethylene, linear low-density polyethylene, ethylene/vinyl acetate copolymers, ethylene/acrylic acid copolymers, ethylene/alkyl acrylate copolymers, ethylene/alkyl methacrylate copolymers (the alkyl group has 1-8 carbon atoms), metal salts (Zn, Al, Li, K, Na, etc.) of ethylene/methacrylic acid copolymers, poly-4-methyl-1-pentene, and ethylene/cycloolefin copolymers, poly(ethylene terephthalate) resins, poly(vinyl chloride) resins, polyamide resins such as nylon-6, nylon-6, 6, nylon-6, 10, and nylon-6, 12, ABS resins, and ionomer resins. Preferred of these are thermoplastic resins having a melting point in the range of 130-280° C., such as polypropylene resins, high-density polyethylene, and poly(ethylene terephthalate) resins. These resins may be used as a mixture of two or more thereof.

It is preferred to use polyolefin resins among those resins. More preferred of the polyolefin resins are polypropylene resins and high-density polyethylene from the standpoints of cost, water resistance, and chemical resistance. Preferably used as such polypropylene resins are a propylene homopolymer (polypropylene) showing isotactic or syndiotactic stereo-regularity or any of various degrees of stereoregularity and a copolymer of propylene as the main component and one or more of α-olefins such as ethylene, 1-butene, 1-hexene, 1-heptene, and 4-methyl-1-pentene. These copolymers may be bi-, tri-, or quadripolymers, and may be random or block copolymers.

For improving ink adhesion, it is preferred to incorporate a thermoplastic resin having polar groups, such as an ethylene/vinyl acetate copolymer, ethylene/acrylic acid copolymer, ethylene/alkyl acrylate copolymer, ionomer, ethylene/alkyl methacrylate copolymer (the alkyl group has 1-8 carbon atoms), metal salt (Zn, Al, Li, K, Na, etc.) of an ethylene/methacrylic acid copolymer, maleic-acid-modified polypropylene, maleic-acid-modified polyethylene, or maleic-acid-modified ethylene/vinyl acetate copolymer. Preferred of these is a maleic-acid-modified ethylene/vinyl acetate copolymer, which has excellent ink adhesion. According to need, an antioxidant, ultraviolet absorber, dispersant, lubricant, compatibilizing agent, flame retardant, coloring pigment, and the like can be added.

In the case where the label of the invention is used as a durable material, it is preferred to add an antioxidant, ultraviolet stabilizer, etc. When an antioxidant is used, it is added generally in an amount in the range of 0.001-1% by weight. For example, a stabilizer such as a steric-hindrance phenol compound, phosphorus compound, or amine compound can be used. When an ultraviolet stabilizer is used, it is added generally in an amount in the range of 0.001-1% by weight. For example, a light stabilizer such as a steric-hindrance amine, benzotriazole compound, or benzophenone compound can be used. The thickness of the printable layer (III) may be in the range of 1-30 μm, preferably 5-20 μm. Thicknesses thereof smaller than 1 μm are undesirable because the result is poor ink adhesion, while thicknesses thereof exceeding 30 μm are undesirable because the label curls and this makes offset printing difficult or makes label fixing to molds difficult.

For mixing the ingredients for constituting the label of the invention, various known mixing techniques can be used without particular limitations. However, a mixing temperature and a mixing period are suitably selected according to the natures of the ingredients used. Examples of the mixing techniques include mixing of ingredients in the state of being dissolved or dispersed in a solvent and the melt kneading method. The melt kneading method is preferred because it has a high production efficiency. Examples thereof include: a method in which thermoplastic resins and additives each in a powder or pellet form are mixed by means of a Henschel mixer, ribbon blender, supermixer, or the like and the resultant mixture is melt-kneaded with a single-screw extruder or twin-screw kneading extruder, extruded into strands, and cut into pellets; and a method in which the melt-kneaded mixture is extruded through a strand die in water and cut with a rotating blade attached to the front end of the die.

The label of the invention can be produced by a combination of two or more of various techniques known to persons skilled in the art. Whatever methods resin films were produced by, use of the resin films is within the scope of the invention as long as the resin films satisfy the requirements specified in the invention.

For producing the label of the invention, use can be made of various known techniques for film production and combinations thereof. Examples thereof include the cast molding method in which molten resins are extruded into a sheet form with a single- or multilayer T-die connected to a screw extruder, film stretching method in which pore formation by stretching is utilized, rolling method in which pores are formed during rolling, calendaring method, foaming method utilizing a blowing agent, method in which hollow particles are used, inflation molding method, solvent extraction method, and method in which an ingredient mixed is dissolved and extracted. Preferred of these is the cast molding method.

The label of the invention can be subjected, according to need, to an activation treatment to improve the printability of the surface of the printable layer (III) beforehand. The activation treatment is at least one treatment selected from corona discharge treatment, flame treatment, plasma treatment, glow discharge treatment, and ozone treatment. Corona treatment and flame treatment are preferred. In the case of corona treatment, it is conducted in an amount of generally 600-12,000 J/m² (10-200 W·min/m²), preferably 1,000 J/m² (20-150 W·min/m²). As long as the amount thereof is 600 J/m² (10 W·min/m²) or larger, the effect of corona discharge treatment can be sufficiently obtained and the application of a surface modifier in a later stage does not result in cissing. On the other hand, even when the amount thereof is increased beyond 12,000 J/m² (200 W·min/m²), the effect of the treatment is not enhanced any more. Consequently, an amount of 12,000 J/m² (200 W·min/m²) or smaller suffices. In the case of flame treatment, it is conducted in an amount of generally 8,000 J/m², preferably 20,000 J/m². As long as the amount thereof is 8,000 J/m² or larger, the effect of flame treatment can be sufficiently obtained and the application of a surface modifier in a later stage does not result in cissing. On the other hand, even when the amount thereof is increased beyond 200,000 J/m², the effect of the treatment is not enhanced any more. Consequently; an amount of 200,000 J/m² or smaller suffices.

Printing of the printable layer (III) of the label of the invention may be one selected from printing techniques such as letterpress printing, gravure printing, offset printing, flexography, and screen printing. For example, a bar code, manufacturer's name, seller's name, character, trade name, directions for use, etc. can be printed. The label printed is separated into labels having a desired shape and dimensions by punching. This in-mold label may be one which is to be bonded to part of the surface of a molded article. Usually, however, the in-mold label is produced as a blank which surrounds the side wall of a cup-shaped container or as a label to be used in blow molding so as to be bonded to the front and/or back side of a bottle-shaped molded article.

(In-Mold Molding)

The molded article obtained using the in-mold label of the invention may be a labeled molded article obtained by placing the label in a mold for differential pressure molding so that the printed side of the label is in contact with the inner surface of the lower female die of the mold, fixing the label to the inner wall of the die by suction, subsequently introducing a molten sheet of a resin as a material for a molded article so that the sheet is located over the lower female die, and then conducting differential pressure molding by an ordinary method to unite and fuse the label to the outer wall of the molded article. The differential pressure molding can be either of vacuum forming and pressure forming. In general, however, the differential pressure molding is one comprising a combination of these two techniques and utilizing a plug assist. This label is especially suitable for use as in-mold label for blow molding, in which a molten resin parison is tightly pressed against the inner wall of a mold by air under pressure. A labeled molded article is thus produced, i.e., through label fixing in a mold and subsequent formation of a molded article bearing the label united therewith. Because of this, the label is free from deformation, shows tenacious adhesion to the molded article main body, and has no blisters. Thus, the molded article decorated with the label has a good appearance.

EXAMPLES

The invention will be explained below in more detail by reference to Production Examples, Examples, and Test Examples. The materials, amounts, proportions, details of treatments, treatment procedures, etc. shown in the following Examples can be suitably modified as long as these modifications do not depart from the spirit of the invention. Consequently, the technical scope of the invention should not be construed as being limited by the following specific Examples, etc.

The methods of property measurements and evaluation methods used in the Production Examples, Examples, and Comparative Examples are as follows.

(1) Property Measurements

The values of MFR, density, and gloss were obtained through measurements made in accordance with JIS-K-6760, JIS-K-7112, and JIS-P-8142 (75 degrees), respectively.

(2) Haze

The values of haze were obtained through a measurement made in accordance with JIS-K-7136 using a hazeometer (NDH 2000), manufactured by Nippon Denshoku Kogyo K.K. Haze in whole layer was measured using a sample sandwiched between two slide glasses (manufactured by MASTUNAMI GLASS CO. LTD.; edge-polished with preclin water; thickness, 0.9-1.2 mm). Internal haze was measured using a sample which was sandwiched between two slide glasses after the examination parts on the front and back sides of the sample had been wetted with liquid paraffin (for infrared analysis; manufactured by Wako Pure Chemical Industries, Ltd.).

(3) Coefficients of Friction

The values were obtained through measurements made in accordance with JIS-K-7125. An in-mold label was superposed on the same label, and the coefficients of machine-direction static friction and machine-direction kinetic friction between the heat-sealable resin layer (II) and the printable layer (III) were determined.

(4) Surface Roughness

The values of surface roughness were obtained through a measurement made in accordance with JIS-B-0601 using Surfcorder SE-30, manufactured by Kosaka Kenkyusho Co., Ltd. The arithmetic average roughness (Ra) and the ten-point average roughness (Rz) were determined.

(5) Offset Printing

Printing machine Type Dia II, manufactured by Mitsubishi Heavy Industries, Ltd., and "Best Cure 161S" (trade name; manufactured by T&K TOKA Co., Ltd.), which was a UV-curable ink, were used to conduct 5,000-sheet continuous printing at a rate of 7,000 sheets per hour using a paper size of half-kiku (636 mm×470 mm) in an atmosphere of 25° C. and a relative humidity of 40% under conditions which caused scumming. An inspection was made in which one sheet was drawn out during the continuous printing and examined for judgment based on the following criteria.

A: Judgment as to whether scumming has occurred or not is easy, and ink transfer can be regulated during operation.

B: Judgment as to whether scumming has occurred or not is relatively easy, and ink transfer can be regulated during operation.

C: Judgment as to whether scumming has occurred or not is difficult, and ink transfer regulation during operation is difficult.

(6) Ink Adhesion

"Cello Tape" (trade name; manufactured by Nichiban Co., Ltd.) was applied to the printed side just after irradiation and then peeled off with an internal-bond tester (manufactured by Kumagai Riki Kogyo Co., Ltd.) to measure the ink adhesion strength (kg·cm) in this peeling. The strength obtained and suitability for practical use were evaluated based on the following criteria.

A: 1 kg·cm or higher (on a level posing no problem in practical use)

B: lower than 1 kg·cm (on a level posing a problem in practical use)

(7) In-Mold Molding

Using a blow molding machine (Type V-50) manufactured by Placo Co., Ltd. and an automatic label feeder manufactured by Pentel Co., Ltd., an in-mold label obtained through punching (width, 70 mm; length, 90 mm) was fixed to one of the splits of a split mold for blow molding (capacity, 800 mL) by means of suction so that the printed side of the label was in contact with the mold. Thereafter, a parison of high-density polyethylene (manufactured by Japan Polychem Corp.; "Novatech PE, HB330; melting point, 133° C." was melt-extruded at 200° C.

Subsequently, the split mold was closed and air compressed to 4.5 kg/cm$^2$ was then supplied into the parison to cause the parison to expand and come into tight contact with the mold.

Thus, the parison was formed into a container shape and simultaneously fused to the in-mold label. The mold was subsequently cooled and then opened, and a label-bearing blow-molded article was taken out. Whether the appearance of the molded article obtained was satisfactory or not was judged based on the following criteria.

A: exceedingly good appearance with transparency.

B: good appearance with transparency.

C: poor appearance with no transparency.

Example 1

As a cooling roll was used a semi-mirror metallic chill roll (temperature, about 70° C.) having a diameter of 450 mm and a width of 1,500 mm which had been obtained by semi-matting the surface of a mirror-surface metallic chill roll plated with hardened chromium and then finishing the semi-matted surface by polishing. This semi-mirror chill roll had an arithmetic average roughness (Ra), a maximum height (Ry), and a ten-point average roughness (Rz), each determined in accordance with the surface roughness (JIS-B-0601), of 0.3 μm, 2.9 μm, and 2.2 μm, respectively. A matte rubber roll having a diameter of 300 mm and a width of 1,500 mm which had a rubber hardness of 70 Hs (JIS spring method; "H" and "s" in the Hs mean hardness and spring, respectively; in accordance with JIS K 6301) and contained 20-55% by weight fine particles having a particle diameter of 31-37 μm (e.g., silica sand or silicate glass powder) was used as a nipping rubber roll in combination with the cooling roll.

The compositions of three-layer resins were as follows. Base layer (I): 100% by weight PP1 shown in Table 1. Heat-sealable resin layer (II): 100 parts by weight of PE1 shown in Table 1 was compounded with 5 parts by weight of AS and 5 parts by weight of AB1 both shown in Table 1 as additives. Printable layer (III): 100 parts by weight of a mixture of 50% by weight PP1 shown in Table 1, 20% by weight PP2, and 30% by weight MAH-EVA shown in Table 1 was compounded with 2 parts by weight of AB2.

These three-layer resin compositions were melt-kneaded at 240° C. with separate extruders and fed to one coextrusion T-die. The resins were superposed to form a three-layer structure in the T-die and then extruded into a sheet form from the T-die at 240° C. The extrudate was led to the nip between the semi-mirror chill roll and the matte rubber roll and cooled while being sandwiched and pressed (linear pressure, about 1.5 kg/cm). This web was led with guide rolls to a corona discharge treatment device and the surface of the printable layer was treated with a corona discharge at 50 W·min/m$^2$.

The web was trimmed and then rolled up on a wind-up machine. Thus, a film having a thickness of 100 μm was obtained.

This multilayered film had a haze in whole layer of 91%, an internal haze of 13%, and a gloss, as measured on the film surface which had been in contact with the semi-mirror metallic chill roll, of 70%. The coefficients of machine-direction kinetic friction and static friction between the heat-sealable resin layer (II) and the printable layer (III) were 0.80 and 0.87, respectively. This film had the following surface roughnesses (JIS-B-0601). The surface of the heat-sealable resin layer (II) had an arithmetic average roughness (Ra) and a ten-point average roughness (Rz) of 1.7 μm and 21 μm, respectively, while the surface of the printable layer (III) had an arithmetic average roughness (Ra) and a ten-point average roughness (Rz) of 0.3 μm and 6.0 μm, respectively.

Example 2

In Example 1, a matte rubber roll having a diameter of 300 mm and a width of 1,500 mm which had a rubber hardness of 70 Hs and contained 20-55% by weight fine particles having a particle diameter of 26-31 μm was used as a nipping roll in combination with the cooling roll.

The compositions of three-layer resins were as follows. Base layer (I): 100 parts by weight of PP1 shown in Table 1 was compounded with 2 parts by weight of the nucleating agent. Heat-sealable resin layer (II): 100 parts by weight of PE1 shown in Table 1 was compounded with 8 parts by weight of AS shown in Table 1 and 4 parts by weight of AB1. Printable layer (III): 100 parts by weight of a mixture of 70% by weight PP1 shown in Table 1 and 30% by weight MAH-EVA shown in Table 1 was compounded with 2.5 parts by weight of AB2.

The same molding method as in Example 1 was used to obtain a film having a thickness of 100 μm. This multilayered film had a haze in whole layer of 94%, an internal haze of 14%, and a gloss, as measured on the film surface which had been in contact with the semi-mirror metallic chill roll, of 70%. The coefficients of machine-direction kinetic friction and static friction between the heat-sealable resin layer (II) and the printable layer (III) were 0.60 and 0.69, respectively. This film had the following surface roughnesses (JIS-B-0601). The surface of the heat-sealable resin layer (II) had an arithmetic average roughness (Ra) and a ten-point average roughness (Rz) of 1.2 μm and 12 μm, respectively, while the surface of the printable layer (III) had an arithmetic average roughness (Ra) and a ten-point average roughness (Rz) of 0.3 μm and 6.0 μm, respectively.

Example 3

In Example 1, the compositions of three-layer resins were as follows. Base layer (I): 100% by weight PP1 shown in Table 1. Heat-sealable resin layer (II): 100 parts by weight of a mixture of 70% by weight PE1 shown in Table 1 and 30% by weight LDPE shown in Table 1 was compounded with 5 parts by weight of AS shown in Table 1 and 5 parts by weight of AB1. Printable layer (III): 100 parts by weight of a mixture of 70% by weight PP1 shown in Table 1 and 30% by weight MAH-EVA shown in Table 1, which had a density of 0.95, was compounded with 2 parts by weight of AB2.

The same molding method as in Example 1 was used to obtain a film having a thickness of 100 μm. This multilayered film had a haze in whole layer of 91%, an internal haze of 13%, and a gloss, as measured on the film surface which had been in contact with the semi-mirror metallic chill roll, of 70%. The coefficients of machine-direction kinetic friction and static friction between the heat-sealable resin layer (II) and the printable layer (III) were 0.65 and 0.76, respectively. This film had the following surface roughnesses (JIS-B-0601) The surface of the heat-sealable resin layer (II) had an arithmetic average roughness (Ra) and a ten-point average roughness (Rz) of 1.5 μm and 19 μm, respectively, while the surface of the printable layer (III) had an arithmetic average roughness (Ra) and a ten-point average roughness (Rz) of 0.3 μm and 6.0 μm respectively.

Example 4

In Example 1, a matte rubber roll having a diameter of 300 mm and a width of 1,500 mm which had a rubber hardness of 70 Hs and contained 20-55% by weight fine particles having a particle diameter of 52-62 μm was used as a nipping roll in combination with the cooling roll.

The compositions of three-layer resins were as follows. Base layer (I): 100 parts by weight of PP1 shown in Table 1 was compounded with 1,000 ppm the nucleating agent. Heat-sealable resin layer (II): 100 parts by weight of PE1 shown in Table 1 was compounded with 4.5 parts by weight of AS shown in Table 1 and 3.5 parts by weight of AB1. Printable layer (III): 100 parts by weight of a mixture of 70% by weight PP2 shown in Table 1 and 30% by weight MAH-EVA shown in Table 1 was compounded with 2.6 parts by weight of AB2.

The same molding method as in Example 1 was used to obtain a film having a thickness of 100 μm. This multilayered film had a haze in whole layer of 98%, an internal haze of 16%, and a gloss, as measured on the film surface which had been in contact with the semi-mirror metallic chill roll, of 70%. The coefficients of machine-direction kinetic friction and static friction between the heat-sealable resin layer (II) and the printable layer (III) were 0.60 and 0.70, respectively. This film had the following surface roughnesses (JIS-B-0601). The surface of the heat-sealable resin layer (II) had an arithmetic average roughness (Ra) and a ten-point average roughness (Rz) of 3.0 μm and 32 μm, respectively, while the surface of the printable layer (III) had an arithmetic average roughness (Ra) and a ten-point average roughness (Rz) of 0.3 μm and 6.0 μm, respectively.

Example 5

In Example 1, a matte rubber roll having a diameter of 300 mm and a width of 1,500 mm which had a rubber hardness of 70 Hs and contained 20-55% by weight fine particles having a particle diameter of 37-44 μm was used as a nipping roll in combination with the cooling roll.

The compositions of three-layer resins were as follows. Base layer (I): 100% by weight r-PP shown in Table 1. Heat-sealable resin layer (II): 100 parts by weight of PE1 shown in Table 1 was compounded with 4.5 parts by weight of AS shown in Table 1 and 3.5 parts by weight of AB1. Printable layer (III): 100 parts by weight of a mixture of 70% by weight r-PP shown in Table 1 and 30% by weight MAH-EVA shown in Table 1 was compounded with 2.6 parts by weight of AB2.

The same molding method as in Example 1 was used to obtain a film having a thickness of 100 μm. This multilayered film had a haze in whole layer of 82%, an internal haze of 7%, and a gloss, as measured on the film surface which had been in contact with the semi-mirror metallic chill roll, of 85%. The coefficients of machine-direction kinetic friction and static friction between the heat-sealable resin layer (II) and the printable layer (III) were 0.70 and 0.80, respectively. This film had the following surface roughnesses (JIS-B-0601). The surface of the heat-sealable resin layer (II) had an arithmetic average roughness (Ra) and a ten-point average roughness (Rz) of 2.3 μm and 28 μm, respectively, while the surface of the printable layer (III) had an arithmetic average roughness (Ra) and a ten-point average roughness (Rz) of 0.3 μm and 6.0 μm, respectively.

Comparative Example 1

In Example 1, an embossed rubber roll having a diameter of 300 mm and a width of 1,500 mm which had a rubber hardness of 70 Hs and was of the reversed gravure type having 250 lines per inch was used as a nipping roll in combination with the cooling roll.

The compositions of three-layer resins were as follows. Base layer (I): 100% by weight PP1 shown in Table 1. Heat-sealable resin layer (II): 100 parts by weight of PE1 shown in Table 1 was compounded with 8 parts by weight of AS shown in Table 1 and 4 parts by weight of AB1. Printable layer (III): 100 parts by weight of a mixture of 92% by weight PP1 shown in Table 1 and 8% by weight calcium carbonate powder having an average particle diameter of 2.2 μm ("Softon 1000" manufactured by Bihokufunka Kogyo K.K.) was compounded with 2.5 parts by weight of AB2.

The same molding method as in Example 1 was used to obtain a film having a thickness of 100 μm. This multilayered film had a haze in whole layer of 62%, an internal haze of 25%, and a gloss, as measured on the film surface which had been in contact with the semi-mirror metallic chill roll, of 60%. The coefficients of machine-direction kinetic friction and static friction between the heat-sealable resin layer (II) and the printable layer (III) were 0.72 and 0.55, respectively. This film had the following surface roughnesses (JIS-B-0601). The surface of the heat-sealable resin layer (II) had an arithmetic average roughness (Ra) and a ten-point average roughness (Rz) of 2.2 μm and 9 μm, respectively, while the surface of the printable layer (III) had an arithmetic average roughness (Ra) and a ten-point average roughness (Rz) of 0.3 μm and 5.5 μm, respectively.

Comparative Example 2

In Example 1, an embossed metallic chill roll (temperature, about 30° C.) which had a diameter of 450 mm and a width of 1,500 mm and had been satin-embossed was used as a cooling roll. Furthermore, an air chamber was used in place of the matte rubber roll.

The compositions of three-layer resins were as follows. Base layer (I): 100% by weight PP1 shown in Table 1. Heat-sealable resin layer (II): 100 parts by weight of PE1 shown in Table 1 was compounded with 1.6 parts by weight of AS as shown in Table 1, 4 parts by weight of AB1, and 4.4 parts by weight of the lubricant. Printable layer (III): 100 parts by weight of r-PP shown in Table 1 was compounded with 1 part by weight of AB2.

These three-layer resin compositions were melt-kneaded at 240° C. with separate extruders and fed to one coextrusion T-die. The resins were superposed to form a three-layer structure in the T-die and then extruded into a sheet form from the T-die at 240° C. The extrudate was led to the space between the embossed metallic chill roll and the air chamber and cooled. This web was led with guide rolls to a corona discharge treatment device and the surface of the printable layer was treated with a corona discharge at 50 W·min/m². The web was trimmed and then rolled up on a wind-up machine. Thus, a film having a thickness of 100 μm was obtained. This multilayered film had a haze in whole layer of 17%, an internal haze of 15%, and a gloss, as measured on the film surface which had faced the air chamber, of 50%. The coefficients of machine-direction kinetic friction and static friction between the heat-sealable resin layer (II) and the printable layer (III) were 0.17 and 0.18, respectively. This film had the following surface roughnesses (JIS-B-0601). The surface of the heat-sealable resin layer (II) had an arithmetic average roughness (Ra) and a ten-point average roughness (Rz) of 0.90 μm and 3.4 μm, respectively, while the surface of the printable layer (III) had an arithmetic average roughness (Ra) and a ten-point average roughness (Rz) of 0.6 μm and 7.6 μm, respectively.

Comparative Example 3

In Comparative Example 1, 100 parts by weight of a mixture of 65% by weight PP1 shown in Table 1 and 35% by weight calcium carbonate powder having an average particle diameter of 2.2 μm ("Softon 1000" manufactured by Bihoku-funka Kogyo K.K.) was compounded with 2.5 parts by weight of AB2 in preparation for a printable layer (III).

The same molding method as in Example 1 was used to obtain a film having a thickness of 100 μm. This multilayered film had a haze in whole layer of 73%, an internal haze of 25%, and a gloss, as measured on the film surface which had been in contact with the semi-mirror metallic chill roll, of 35%. The coefficients of machine-direction kinetic friction and static friction between the heat-sealable resin layer (II) and the printable layer (III) were 0.65 and 0.50, respectively. This film had the following surface roughnesses (JIS-B-0601). The surface of the heat-sealable resin layer (II) had an arithmetic average roughness (Ra) and a ten-point average roughness (Rz) of 2.2 μm and 9 μm, respectively, while the surface of the printable layer (III) had an arithmetic average roughness (Ra) and a ten-point average roughness (Rz) of 1.0 μm and 10 μm, respectively.

TABLE 1

| Ingredient | Kind | Details | Density (g/cm³) |
|---|---|---|---|
| Thermoplastic resin | propylene homopolymer 1 (PP1) | [trade name MA3U; Japan Polypropylene Corp.] (MFR (230° C., 2.16 kg-load) = 15 g/10 min) | 0.90 |
| | propylene homopolymer 2 (PP2) | [trade name FB3C; Japan Polypropylene Corp.] (MFR (190° C., 2.16 kg-load) = 7 g/10 min) | 0.90 |
| | propylene random copolymer (r-PP) | [trade name FW3E; Japan Polypropylene Corp.] (MFR (190° C., 2.16 kg-load) = 7 g/10 min) | 0.89 |
| | ethylene/1-hexene copolymer 1 (PE1) | [trade name Kernel, KS240T; Japan Polyethylene Corp.] (MFR (190° C., 2.16 kg-load) = 2.2 g/10 min) | 0.88 |
| | low-density polyethylene (LDPE) | [trade name Novatec LD, LC500; Japan Polyethylene Corp.] (MFR (190° C., 2.16 kg-load) = 4 g/10 min) | 0.92 |
| | maleic-acid-modified ethylene/vinyl acetate copolymer (MAH-EVA) | [trade name Modic AP, A515; Japan Polyethylene Corp.] (MFR (190° C., 2.16 kg-load) = 9.5 g/10 min) | 0.95 |
| Additive | antistatic agent (AS) | [trade name Novatec LL, LX-AS; Japan Polyethylene Corp.] (MFR (190° C., 2.16 kg-load) = 2 g/10 min) | 0.92 |
| | antiblocking agent 1 (AB1) | [trade name Kernel, KMB32F; Japan Polyethylene Corp.] (MFR (190° C., 2.16 kg-load) = 3.5 g/10 min) | 0.91 |
| | antiblocking agent 2 (AB2) | [trade name Novatec PP, FMB1650B; Japan Polypropylene Corp.] (MFR (190° C., 2.16 kg-load) = 7 g/10 min) | 0.90 |
| | nucleating agent | [trade name Novatec PP, TX922A; Japan Polypropylene Corp.] (MFR (190° C., 2.16 kg-load) = 10 g/10 min) | 0.90 |
| | Lubricant | [trade name Novatec LD, PEAFG; Japan Polyethylene Corp.] (MFR (190° C., 2.16 kg-load) = 4 g/10 min) | 0.92 |

TABLE 2

| | Evaluation item | | Unit | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|---|---|---|
| Label | Label applied | | — | label (1) | label (2) | label (3) | label (4) | label (5) | label (6) | label (7) | label (8) |
| | Thickness | | μm | 100 | 100 | 100 | 100 | 100 | 100 | 100 | 100 |
| | Density | | g/cm³ | 0.87 | 0.90 | 0.88 | 0.87 | 0.87 | 0.91 | 0.90 | 0.91 |
| | Haze | overall | % | 91 | 94 | 91 | 98 | 82 | 62 | 17 | 73 |
| | | internal | % | 13 | 14 | 13 | 16 | 7 | 25 | 15 | 25 |
| | Gloss | Print side | % | 70 | 70 | 70 | 70 | 85 | 60 | 50 | 35 |
| | Coefficient of friction | static | — | 0.87 | 0.69 | 0.76 | 0.70 | 0.80 | 0.72 | 0.18 | 0.65 |
| | | kinetic | — | 0.80 | 0.60 | 0.65 | 0.60 | 0.70 | 0.55 | 0.17 | 0.50 |
| | Surface roughness of heat-sealable resin layer (II) | Ra | μm | 1.7 | 1.2 | 1.5 | 3.0 | 2.3 | 2.2 | 0.90 | 2.2 |
| | | Rz | μm | 21 | 12 | 19 | 32 | 28 | 9 | 3.4 | 9 |
| | Surface roughness of printable layer (III) | Ra | μm | 0.3 | 0.3 | 0.3 | 0.3 | 0.3 | 0.3 | 0.6 | 1.0 |
| | | Rz | μm | 6.0 | 6.0 | 6.0 | 6.0 | 6.0 | 5.5 | 7.6 | 10 |

TABLE 2-continued

| | Evaluation item | Unit | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|---|---|
| Performance evaluation | Trouble detection during printing | — | A | A | A | A | B | C | C | C |
| | Ink adhesion strength | kg·cm | 2.0 | 2.0 | 2.0 | 2.0 | 3.0 | 0.5 | 0.5 | 0.6 |
| | | — | A | A | A | A | A | B | B | B |
| | Appearance of IML-B molded article | — | B | B | B | B | A | C | C | C |

When the in-mold label of the invention is used, a printing trouble in offset printing can be easily eliminated during continuous printing and a molded article produced through in-mold molding has a good appearance. The molded article that the label was attached, was also obtained.

The label is for use in in-mold molding in which a molten thermoplastic resin is injection-molded or a sheet of a molten thermoplastic resin is subjected to vacuum forming or pressure forming to thereby produce a labeled molded article. It is suitable for use in industrial fields where resins are molded.

This application is based on Japanese patent application JP 2005-058360, filed on Mar. 3, 2005, the entire content of which is hereby incorporated by reference, the same as if set forth at length.

What is claimed is:

1. An in-mold label which comprises a base layer (I), a heat-sealable resin layer (II), and a printable layer (III) and has a haze in whole layer of 80-100% and an internal haze of 0-20%, wherein
   the heat-sealable resin layer (II) has an arithmetic average roughness (Ra) and a ten-point average roughness (Rz), which indicate the surface roughness (JIS-B-0601) of the layer, of 0.5-10 μm and 10-50 μm, respectively;
   the printable layer (III) has an arithmetic average roughness (Ra) and a ten-point average roughness (Rz), which indicate the surface roughness (JIS-B-0601) of the layer, of 0.15-2.0 μm and 2-20 μm, respectively.

2. The in-mold label of claim 1, wherein the heat-sealable resin layer (II) has an arithmetic average roughness (Ra) of from 1.2 to 3.0 μm and a 10-point average roughness (Rz) of from 19 to 32 μm; and the in-mold label has a haze in whole layer of from 82 to 98% and an internal haze of from 7 to 16%.

3. The in-mold label according to claim 1, having a coefficient of static friction of from 0.69 to 0.87 and a coefficient of kinetic friction of from 0.60 to 0.80.

4. An in-mold label which comprises a base layer (I), a heat-sealable resin layer (II), and a printable layer (III) and has a haze in whole layer of 80-100% and an internal haze of 0-20%, wherein
   the heat-sealable resin layer (II) has an arithmetic average roughness (Ra) and a ten-point average roughness (Rz), which indicate the surface roughness (JIS-B-0601) of the layer, of 0.5-10 μm and 10-50 μm, respectively;
   the printable layer (III) has an arithmetic average roughness (Ra) and a ten-point average roughness (Rz), which indicate the surface roughness (JIS-B-0601) of the layer, of 0.15-2.0 μm and 2-20 μm, respectively, and
   wherein the base layer (I), the heat-sealable resin layer (II), and the printable layer (III) are unstretched films and no layer of the unstretched films are stretched.

5. The in-mold label of claim 4, wherein the printable layer (III) has a gloss (JIS-Z-8741; measured at 75 degrees) of 40-90%.

6. The in-mold label of claim 4, wherein the printable layer (III) contains a maleic-acid-modified vinyl acetate polymer and has an ink adhesion strength, as measured at 24 hours or more after printing, of 1 kg·cm or higher.

7. The in-mold label of claim 4, which when superposed on the same in-mold label, has a coefficient of machine-direction static friction (JIS-K-7125) between the heat-sealable resin layer (II) and the printable layer (III) of 0.55-1.0 and a coefficient of machine-direction kinetic friction between the heat-sealable resin layer (II) and the printable layer (III) of 0.3-1.0.

8. The in-mold label of claim 4, wherein the heat-sealable resin layer (II) comprises a polyethylene resin having a melting point of 110° C. or lower.

9. The in-mold label of claim 4, wherein at least the heat-sealable resin layer (II) contains an antistatic agent.

10. The in-mold label of claim 4, wherein the printable layer (III) is printed by a printing technique selected from letterpress printing, gravure printing, offset printing, flexography, and screen printing.

11. A molded article in which the in-mold label of claim 4 is attached.

12. The molded article of claim 11, which comprises a polyolefin resin.

13. The in-mold label of claim 4, wherein the haze in whole layer is 90-100% and the internal haze is 0-18%.

14. The in-mold label according to claim 13, wherein the printable layer (III) has a gloss of 50-90%.

15. The in-mold label of claim 4, wherein the heat-sealable resin layer (II) has an arithmetic average roughness (Ra) of 1.5-5.0 μm and a 10-point average roughness (Rz) of 10-40 μm.

16. The in-mold label of claim 15, wherein the printable layer (III) has an arithmetic average roughness (Ra) of 0.2-1 μm and a 10-point average roughness (Rz) of 4-10 μm.

17. The in-mold label of claim 4, having a thickness of 40-200 μm.

18. The in-mold label of claim 4, wherein the base layer (I) is a polypropylene, the heat-sealable resin layer (II) is at least one of an ethylene/1-hexene copolymer and a low density polyethylene, and the printable layer (III) is a maleic-acid modified ethylene/vinyl acetate copolymer.

19. The in-mold label of claim 4, having a haze in whole layer of 82-98% and an internal haze of 7-16%.

20. The in-mold label of claim 19, wherein the heat-sealable resin layer (II) has an arithmetic average roughness (Ra) of 1.2-3.0 μm and a 10-point average roughness (Rz) of 12-30 μm.

21. The in-mold label of claim 20, wherein the printable layer (III) has an arithmetic average roughness (Ra) of 0.15-0.3 μm and a 10-point average roughness (Rz) of 2-6 μm.

22. The in-mold label of claim 4, having a thickness of from 20 to 250 μm.

23. The in-mold label of claim 4, in the form of a printed in-mold label wherein at least the printable layer (III) is printed with an ink.

24. The in-mold label of claim 4, in the form of a printed in-mold label wherein at least the printable layer (III) comprises one or more ink images on an exterior surface.

25. The in-mold label of claim 4, in the form of a printed in-mold label wherein at least the printable layer (III) comprises an offset printed ink image.

26. The in-mold label of claim 4, in the form of a cut and printed in-mold label wherein at least the printable layer (III) comprises an offset printed ink image.

27. The in-mold label of claim 4, wherein the heat-sealable resin layer (II) has an arithmetic average roughness (Ra) of from 1.2-3.0 μm and a 10-point average roughness (Rz) of from 19-32 μm; and the in-mold label has a haze in whole layer of from 82 to 98% and an internal haze of from 7 to 16%.

28. The in-mold label according to claim 27, having a coefficient of static friction of from 0.69-0.87 and a coefficient of kinetic friction of 0.60-0.80.

* * * * *